United States Patent

[11] 3,574,949

[72] Inventor Philo T. Farnsworth
        Salt Lake City, Utah
[21] Appl. No. 811,835
[22] Filed Apr. 1, 1969
[45] Patented Apr. 13, 1971
[73] Assignee Frederick R. Furth
        Cornwall Bridge, Conn.
        a fractional part interest

[54] LUMBER DRYING
    14 Claims, 8 Drawing Figs.
[52] U.S. Cl. .................................................. 34/16.5,
        34/5, 34/9.5, 34/13.4, 34/13.8
[51] Int. Cl. ......................................................... F26b 5/04
[50] Field of Search ........................................... 34/5, 9.5,
        13.4, 13.8, 16.5

[56] References Cited
    UNITED STATES PATENTS

| | | | |
|---|---|---|---|
| 2,453,033 | 11/1948 | Patterson | 34/5 |
| 2,803,888 | 8/1957 | Cerletti | 34/5 |
| 2,830,382 | 4/1958 | Petersen | 34/165 |
| 3,283,412 | 11/1966 | Farnsworth | 34/5 |

FOREIGN PATENTS

| 552,821 | 4/1943 | Great Britain | 62/160 |
|---|---|---|---|

*Primary Examiner*—William J. Wye
*Attorney*—Hood, Gust, Irish and Lundy

ABSTRACT: In this invention means are provided for maintaining an accelerated liquid diffusion rate through the cell walls of green lumber, for the formation of small ice crystals at the surfaces, for the direct transformation of the ice crystals into water vapor (sublimation) as rapidly as they are formed, and for the removal of the water vapor, without damage to the wood. The rate of drying is thus extremely high, being in the order of some 30 to 40 times faster than by forced-air drying and without the losses from cracking, checking and warping associated with the forced-air system. The apparatus includes a sealed chamber in which green lumber to be dried is placed. A refrigeration system consisting of the usual compressor, condenser and evaporator elements is contained within the chamber. The condenser coils are mounted on the sidewalls to radiate heat into the central and upper portions of the chamber. The evaporator is located in the bottom of the chamber to reduce the temperature thereof to a value well below that at which water freezes, and to create a region of very low vapor pressure. A vacuum pump is connected to the chamber for reducing the pressure and temperature therein to a value at which moisture in the lumber is diffused through the cell walls and ice crystals form on the surfaces. Heat from the condenser and the heater "sticks" disposed between layers of lumber sublime the ice crystals as fast as they are formed, the water vapor therefrom gravitating to the lower region of the chamber where it is condensed and formed into ice. This process is performed in such a way that the lumber never freezes and the subliming action is continuous during the drying cycle.

Patented April 13, 1971 3,574,949
3 Sheets-Sheet 1
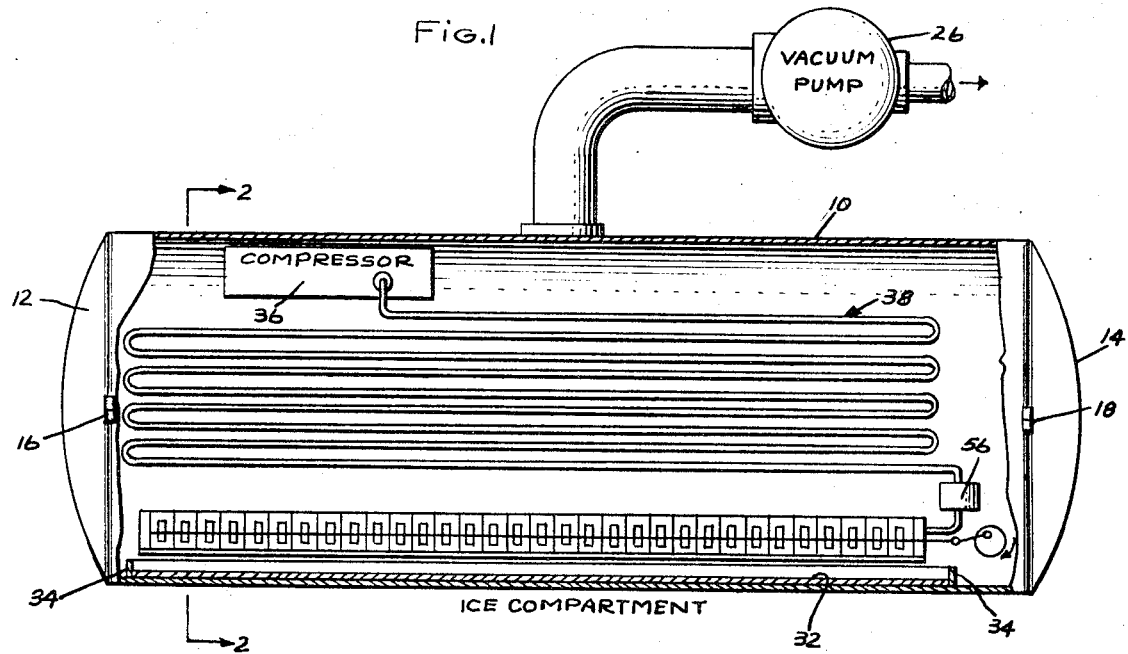
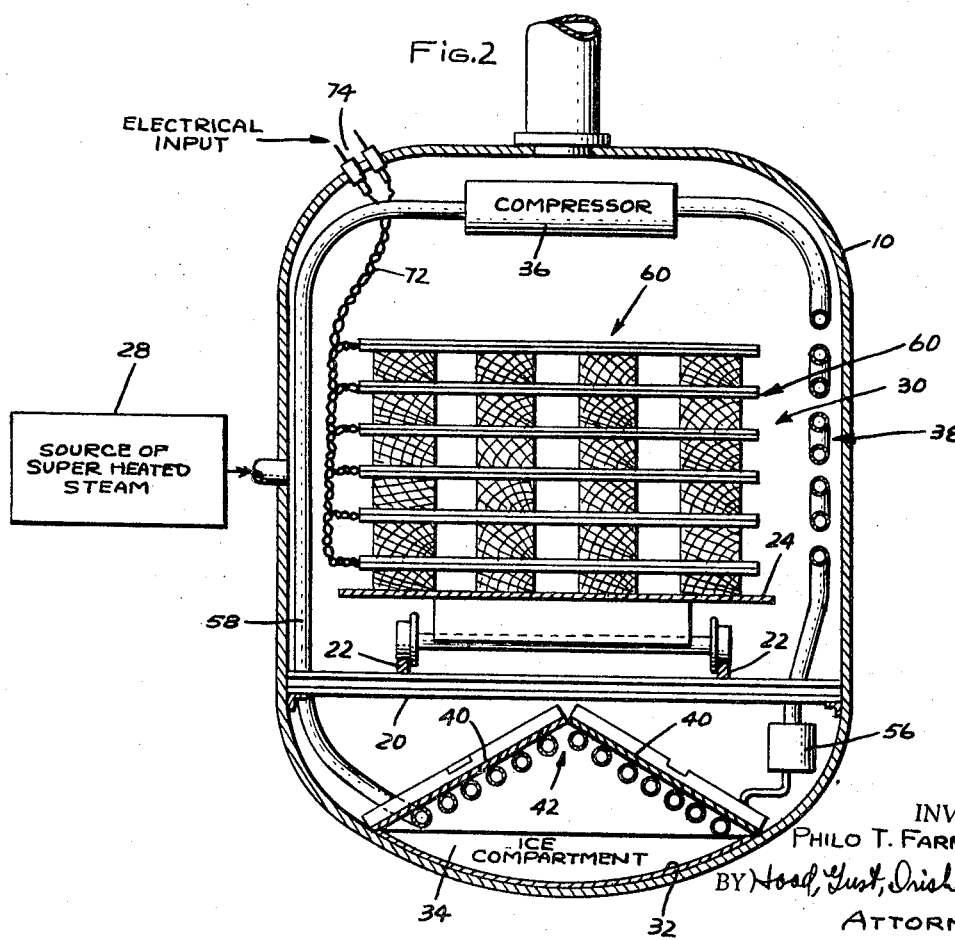
INVENTOR.
PHILO T. FARNSWORTH,
BY Hood, Gust, Irish & Lundy
ATTORNEYS.

Patented April 13, 1971 3,574,949
3 Sheets-Sheet 2
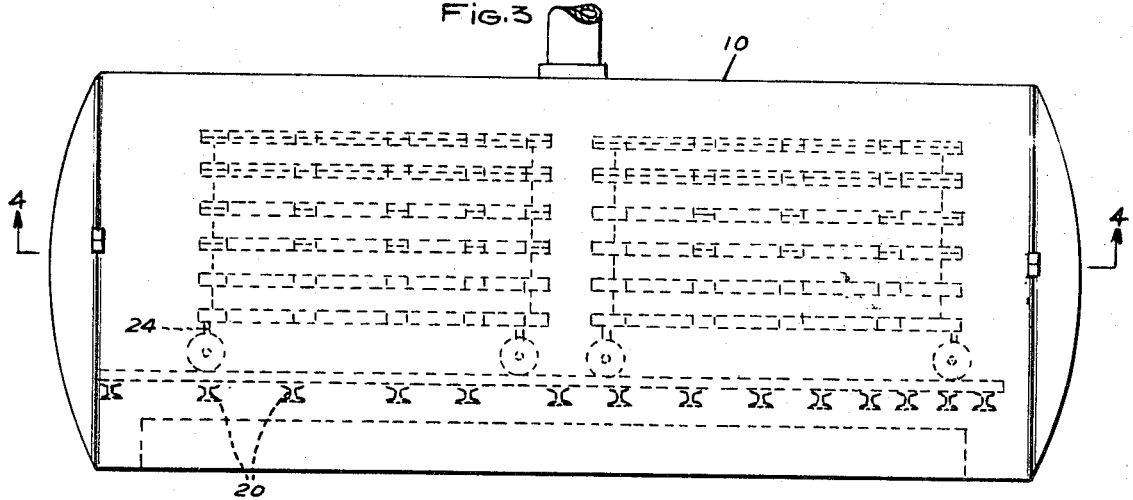
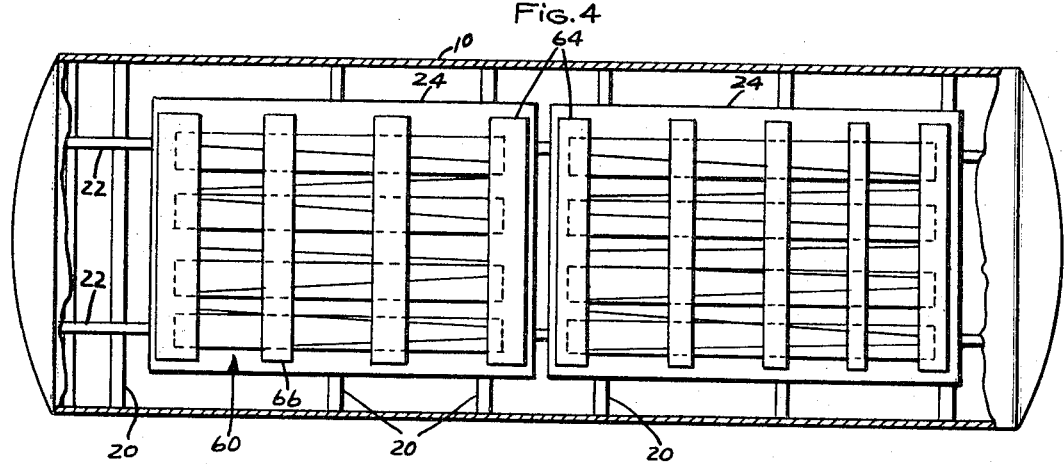
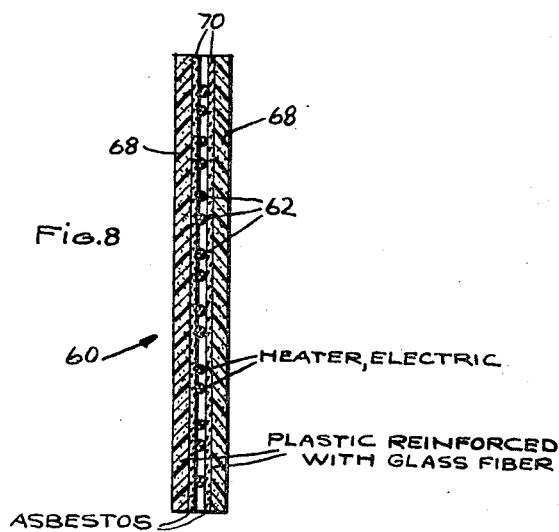
INVENTOR.
PHILO T. FARNSWORTH,
BY
ATTORNEYS.

Patented April 13, 1971
3,574,949
3 Sheets-Sheet 3
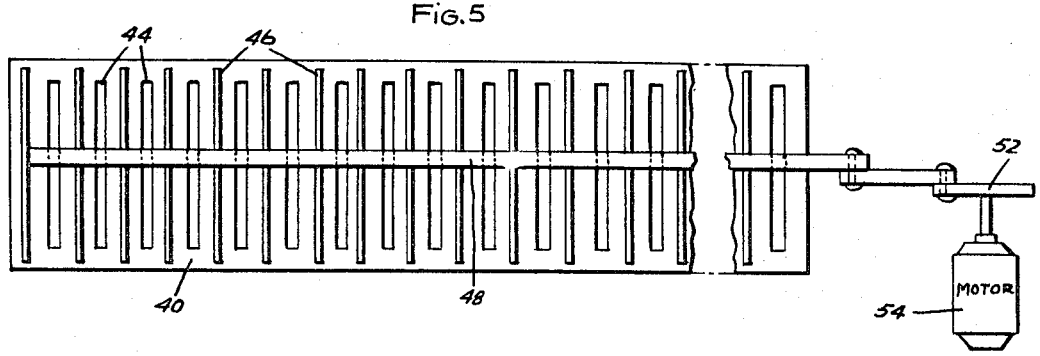
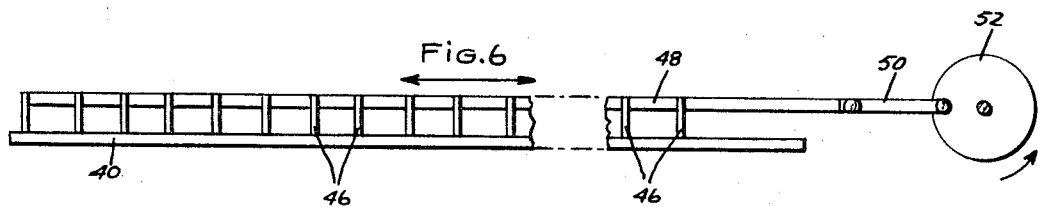
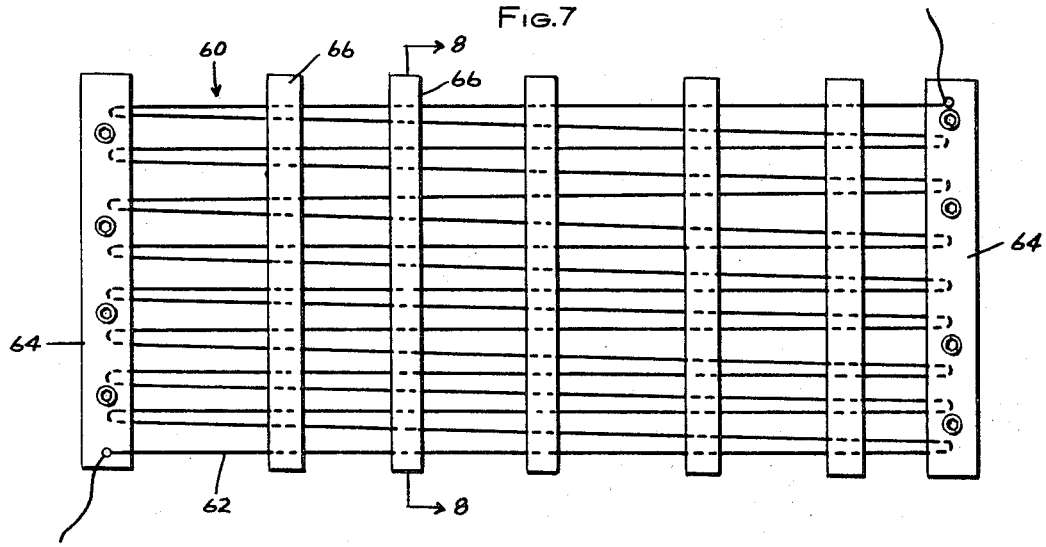
INVENTOR:
PHILO T. FARNSWORTH,
BY Hood, Gust, Irish & Lundy
ATTORNEYS.

LUMBER DRYING

BACKGROUND OF THE INVENTION

1. Field of the Invention

This invention relates generally to improvements for processing lumber and more particularly to a method and apparatus for the rapid removal of moisture from green lumber.

2. Description of the Prior Art

This invention is an improvement on the invention disclosed and claimed in U.S. Pat. No. 3,283,412, issued Nov. 8, 1966 to Farnsworth In this prior patent, a method and apparatus are disclosed wherein a chamber containing a stack of green lumber has the pressure reduced therein to a value at which moisture is rapidly diffused through the cell walls and the temperature of the lumber surface so lowered that ice crystals form thereon. The rate of evacuation of the chamber and the application of heat therein are so controlled that the lumber itself is prevented from freezing. As fast as the ice crystals are formed, they are sublimed, the water vapor resulting therefrom moving to a lower vapor-pressure region in the bottom portion of the chamber which is created by means of a saturated brine maintained at subzero temperatures, where the vapor condenses and enters the brine solution. The brine is continuously circulated to an external system wherein the concentration of the brine is restored and maintained cool. In cooling the brine externally, a conventional refrigeration system is utilized.

SUMMARY OF THE INVENTION

In the present invention, the refrigerating system, instead of being external to the chamber, is disposed internally thereof in a unique arrangement whereby the heat of compression is utilized to assist in maintaining the sublimation temperatures while the evaporating coils replace the brine solution and are used to condense the water vapor and to form ice. Heat energy lost to the system by having the refrigeration system external to the chamber is completely utilized when the system is mounted internally, thereby contributing to the overall efficiency and economy of the drying operation.

It is an object of this invention to provide an improved apparatus and method for the drying of lumber.

It is another object of this invention to provide an apparatus and method for drying lumber wherein the normal refrigeration cycle is utilized in a unique way to provide at least a portion of the heat of sublimation as well as the necessary cold for condensing water vapor and producing ice. In this connection, the lumber is placed in a chamber in which the pressure is reduced to a value where the temperature therein is lowered to the freezing point of water and where the pressure differential within the boards and their surfaces is such that the moisture in the boards moves to the surfaces and forms ice crystals. These ice crystals are transformed directly into water vapor (sublimed) without melting so as to avoid wetting the lumber surface, the water vapor created thereby moving to the bottom of the chamber where it is condensed and frozen.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 1 is a diagrammatic illustration, in side elevation, partially sectioned longitudinally, of an embodiment of this invention;

FIG. 2 is a cross section taken substantially along section line 2–2 of FIG. 1;

FIG. 3 is a side elevation thereof showing stacks of lumber in phantom;

FIG. 4 is a top plan view partially sectioned showing the stacked lumber of FIG. 3;

FIG. 5 is a top plan view of one of the freezer plates and wiper mechanisms used in the bottom portion of the chamber of the preceding FIGS.;

FIG. 6 is a side view of the mechanism of FIG. 5;

FIG. 7 is a top plan view of one of the "sticks" used between layers of lumber shown in FIGS. 2, 3 and 4; and FIG. 8 is a cross section taken substantially along section line 8–8 of FIG. 7.

DESCRIPTION OF THE PREFERRED EMBODIMENT

Referring to the drawings, a large steel enclosure or chamber 10 of economically suitable dimensions 10 to 12 feet across and 24 feet long, e.g., is provided with hermetically sealed doors 12 and 14 at the opposite ends thereof which may be hinged at the sides 16 and 18, respectively, as shown. The cross section of the chamber may take any form, but in this embodiment is ellipsoidal. Within the chamber 10 are secured relatively strong steel I-beam 20 which support steel tracks 22 adapted to carry a low, flat-bedded wheeler vehicle 24 used to transport stacked boards in and out of the drying chamber 10.

A high capacity vacuum pump 26 is connected to the chamber 10 as shown. Also, a vacuumtight valved-off intake, connected to a source 28 of superheated steam, for the introduction of superheated dry steam and for lumber processing media is connected to the chamber as shown more clearly in FIG. 2 directly opposite the central portion of the chamber which receives the stack 30 of green lumber, this portion or region being referred to hereinafter as the lumber-receiving region of the chamber 10.

Those parts of the present invention just described may be the same as those disclosed in the aforesaid U.S. Pat. No. 3,283,412 to Farnsworth.

Below the horizontal I-beam 20 in the bottom of the chamber 10 is a semicircular trough 32 of metal or the like that is supported on slides attached to the bottom wall of the chamber 10 so that it may be withdrawn therefrom. This trough 32 is insulated thermally from the chamber wall and extends the full length of the chamber. The trough 32 is closed at each end by a removable metal or the like end piece 34 and further may be sectionalized by similar horizontal walls or partitions. The inner surface of the trough 32 as well as the surfaces of end pieces 34 and any sectional dividers preferably are coated with polytetrafluoroethylene (Teflon) or the like to provide a slippery surface to which ice will not adhere. The trough 32 is in fact a very large "ice tray" in which blocks of ice of one hundred (100) pounds or the like may be frozen.

In the top part of the chamber 10, in the volume directly above the space occupied by the stacked lumber 30, are one or more compressors 36 of a conventional refrigeration system. High pressure refrigerant lines forming a condenser indicated by the numeral 38, connected to the compressors 36, are formed into a coplanar coil arrangement vertically parallel to one or both of the chamber sidewalls. As shown more clearly in FIGS. 1 and 2, the condenser 38 parallels the volume occupied by the stacked lumber 30 and extends for substantially the entire length and height of the lumber stack as shown. The inside walls of the chamber 10 are utilized as heat reflectors and may be coated with a heat-reflecting paint or covering to increase the efficiency.

Directly above the ice compartment 32, and supported beneath the horizontal I-beam 20, are two metal or the like freezing plates 40 formed at an angle of about 150 as shown with the apex thereof on the vertical center line of the chamber 10. These plates 40 which extend the full length of the ice compartment 32 are of a width that just covers the trough. The surfaces thereof are coated with polytetrafluoroethylene (Teflon) or a similar material. The freezing coils or evaporator generally indicated by the numeral 42 of the refrigeration system is mounted in contact with the undersides of the freezing plates 40 and maintain the latter as well as the surrounding volume at a temperature of at least −10° C. These plates 40, as shown more clearly in FIG. 5, are provided with a plurality of elongated openings or slots 44 spaced apart and parallel such that mush ice formed on the plates may fall therethrough into the ice compartment 32. The length of the openings is perpendicular to the length of the plates 40. Motor-driven mechanical wiper blades 46 are superposed on the plates 40 for wiping the soft or mush ice off the plates into the slots 44. These wiper blades 46, which are of Teflon coated metal or other material which will not damage the coated freezing plates, preferably are disposed in parallel spaced apart relation and are mounted on a common bar 48 which is reciprocated by means of a pitman 50 and wheel 52 which is rotated by means of an electric motor 54. As the wheel 52 rotates, the bar 48 is reciprocated thereby moving the blades 46 to and fro over the upper surface of the respective freezing plate 40. Mush or soft ice from this surface is wiped into the slots 44 from which the ice gravitates into the compartment 32.

Connected between the evaporator 42 and the condenser 38 is the usual expansion valve 56 (FIGS. 1 and 2). The low-pressure side of the evaporator 42 is connected by means of a line 58 to the input side of the compressor 36 as shown.

In the drying of lumber, "sticks" are used for maintaining adjacent layers of boards separated. In the present invention, these "sticks" take on a unique form, the construction being as shown in FIGS. 7 and 8. Each "stick," indicated generally by the numeral 60, includes an electrical heater which, in the illustrated embodiment, consists of a heavy duty resistance wire 62 stretched back and forth around insulators and contained between two insulator bars 64 as shown. The wire 62 preferably is a single length looped in hairpin curves to extend between end bars 64. Similar insulator bars 66 are clamped to the gridwork of heater wires 62, these parallel bars 66 being spaced apart at suitable distances to prevent excess sagging of the heating element and the boards, as shown. Generally speaking, the construction of these bars 64 and 66 is the same such that a description of one bar 66 will suffice for all. Each of these bars includes two flat pieces 68 of suitable heat-resistant plastic reinforced with glass fibers. On the inner faces of these pieces 68 are laid two sheets of asbestos 70, or other suitable electrical and thermal insulating material, the heater wires 62 being clamped therebetween as shown. Suitable bolts or adhesive may be used for securing the bars in assembly. Of importance is the fact that the bars 64 and 66 are fabricated of a noncorrosive, heat-resistant electrical insulating material. The size of the "sticks" 60 are the full width and length of the lumber stack 30 as shown in FIG. 2. Instead of the resistance wire 62, a gridwork of nichrome, chromal, stainless steel ribbon, or the like may be used. The two ends of the heating grid terminate in an electrical connector that plugs into a wiring harness indicated by the numeral 72 in FIG. 2 which leads to feed-through insulators 74 in the chamber 10 as shown. A suitable power supply (not shown) may be connected to the insulators 74 for the purpose of applying power to the "sticks" 60.

Green lumber is stacked on the flat-bed car 24 with "sticks" 60 under the first layer of boards and between each successive layer. A "stick" 60 is also disposed on top of the stack. The boards are separated from each other by the bars 64 and 66 of the "sticks" 60 and the heater gridwork 62 occupies the space between boards to be directly exposed to the surfaces thereof. Heat from the gridwork 62 is distributed uniformly over each board surface. Before the drying operation is begun, the ends of the boards are coated with acrylic latex or some other rapid drying sealant to prevent ice from forming thereon and cracking them.

The lumber which is stacked on the flat beds 24 outside of the chamber 10 are rolled into the chamber and the "sticks" 60 are connected to the electrical harness 72. The doors 12 and 14 are closed and sealed and the drying cycle is started by supplying a small amount of heat to the boards by the "sticks" 60 connected to the electrical power through the harness 72. The vacuum pump 26 is started. As the pressure in the chamber 10 is reduced with a corresponding lowering of the temperature, the heat developed by the "sticks" 60 is increased by increasing the power supplied to the harness 72. Since moisture will start being withdrawn from the boards as the pressure is being reduced, the compressor 36 is started to relieve the vacuum pump 26 from having to remove water vapor by freezing such water vapor in the lower volume of chamber 10. Compressing the refrigerant generates a large quantity of heat which must be removed. This heat is radiated toward the lumber stack 30 by the condenser 38. Thus, the demand for electrical heating is minimized.

When the pressure in the chamber approaches $10^{11}$ torr and the pumping rate starts to fall significantly, the pump 26 can be assisted by admitting a "flash" of live dry steam, superheated, and at superatmospheric pressure, if available, into the chamber 10. The steam not only scavenges the remaining air in the chamber 10 and carries it to the freezing plates 40, but also supplies some heat to the boards in the stack 30.

Ice crystals will commence to form on the surfaces of the boards in the stack 30 when the pressure reaches about $10^{11}$ torr. At that point, the electric power required by the "sticks" 60 will be about 2 to 2¼ kilowatts (200 amperes at 10 to 12 volts). The ice must be sublimed as rapidly as it is formed in order to prevent the boards from freezing and their surfaces from becoming wetted and possibly stained or diseased. The water vapor produced thereby will seek out the region of lowest vapor pressure which is in the vicinity of the freezing coils 42. As the vapor comes into contact with the freezing plates 40, a soft or mush ice is formed which is scraped therefrom immediately by the wiping mechanism 46, 48 and falls into the ice compartment 32 where it freezes solidly and ultimately builds into large blocks.

As moisture is withdrawn from the boards, the pressure therein will be decreased with a corresponding decrease in the liquid diffusion rate and the rate at which ice crystals are formed. Accordingly, the applied heat from the "sticks" must be reduced to prevent scorching. To maintain a constant temperature throughout the drying cycle, heat-sensing elements (not shown) are used to activate a servomechanism that regulates a power rheostat, for example, which controls the current flowing through the coils 62 of the "sticks" 60.

At the end of the drying cycle, the dry lumber may be processed by treating with fireproofing, fungicides, dies, waterproofing materials and the like. The vacuum pump, compressors and heating elements are shut down. The liquid chemical selected is admitted to the chamber 10 from a manifold connected to the intake 28 where it vaporizes and penetrates the boards. Excess vapor may be drawn off by the vacuum pump 26, condensed and reclaimed for further use. When the processing of the lumber has been completed, the chamber 10 is let down to air pressure, the doors 12 and 14 are opened and the cars of dry lumber and the ice compartment 32 are removed. The ice, which is free from impurities, is a source of pure water. This water may be bottled for sale or used as boiler feed water in connection with the generation of a supply of steam.

Recapitulating, operation of the various components is so balanced as to provide the operating conditions whereby the formation of relatively small, as contrasted with large, ice crystals and the sublimation thereof occurs without permitting the boards themselves to freeze internally or reduce substantially in temperature.

In obtaining this proper balance, the temperature at the surfaces of the boards should be maintained as closely as possible to a value of about −1° C. This is accomplished by controlling the pressure inside the chamber 10 by means of the pump 26. It is desirable to maintain the temperature of the freezing plates 40 and the immediate surrounding vapor-absorbing region within a value of about −10° C. to about −40° C. Under these operating conditions, a maximum vapor-pressure differential of approximately some 40 to 1 between the lumber (4.26 mm. of mercury) and the plates 40 (0.1 mm. of mercury) is achieved. Accordingly, almost all of the aqueous vapor condenses onto the plates 40, and the vacuum pump 26 is required to remove only the nonwater soluble vapors which may be within the chamber 10. It is important to hold the temperature of the surfaces of the boards in the stack 30 close to the value of −1° C., because the vapor pressure changes rapidly with small changes in temperature in this region and could affect adversely the sublimation rate. The sublimation must be maintained at a rate that will avoid permitting the boards to freeze, as this would result in cracking and splitting of the boards. Additionally, the speed of drying will be adversely affected unless a wide vapor-pressure differential is maintained between the board surfaces and the evaporator 40. A board temperature of about −1° C. is correct for an evaporator temperature of at least −10° C. to maintain the subliming and evaporation process at a desirable rate. However, this temperature as well as the other operating conditions of the various components may vary without departing from the scope of this invention, so long as the above-mentioned results are achieved; these include the cooling of the board surfaces to a temperature where ice crystals form, the prevention of the boards from cooling to the point at which they freeze, and the removal of the aqueous vapor resulting from the vaporization of moisture in the lumber by the sublimation of ice crystals.

The "sticks" 60, aided by the condenser 38, supply the heat necessary to sublime promptly all ice crystals that may form. Since all refrigeration systems produce heat in order to cool, the heat radiated by the condenser 38 becomes a useful instrumentality. This invention utilizes this heat for the purpose of increasing efficiency of operation. By locating the condenser 38 along one or both sides and for the entire length of the lumber stack 30, a wall of heat is created which radiates toward the stack. Of importance is the fact that there is a vapor-pressure (temperature) differential between two different regions inside the chamber 10, these regions first being the one occupied by the lumber stack 30 and the second being the one occupied by the cooling coils 42, the freezing plates 40 and the ice compartment 32.

The method of this invention avoids losses due to cracking, checking and warping of the lumber during drying. In order to accomplish this, a delicate balance must be maintained throughout the drying process between the liquid diffusion rate through the wood cells and the removal of moisture from the surfaces. Since it is not possible to maintain this balance accurately in the forced-air drying kiln, losses from damage to the boards are sustained. In this invention, diffusion is controlled by a pressure differential within the boards and the surrounding medium and likewise control is effected of the rate of moisture removal from the surfaces by applied heat, the wood cells not being damaged and thereby maintaining the original sizes and shapes thereof.

This invention constitutes an improvement over the arrangement of U.S. Pat. No. 3,283,412, to Farnsworth and insofar as necessary to complete the disclosure of this invention, reference may be made to this previously issued patent.

While there have been described above the principles of this invention in connection with specific apparatus, it is to be clearly understood that this description is made only by way of example and not as a limitation to the scope of the invention.

I claim:

1. Improvements in lumber-drying apparatus including a sealed chamber having a lumber-receiving region; a refrigeration system in said chamber, said refrigeration system including a condenser mounted to radiate heat into the lumber-receiving region of said chamber, an evaporator connected to said condenser and being disposed in a vapor-absorbing region of said chamber, said vapor-absorbing region being spaced from said lumber-receiving region, said evaporator cooling said vapor absorbing region to a temperature at which water vapor will condense and freeze, means for reducing the pressure and temperature within said chamber to a value at which moisture in green lumber is diffused to the surface of said lumber and the temperature at the surface of said lumber is held below the freezing point of water vapor without freezing said lumber.

2. The improvements of claim 1 wherein said vapor-absorbing region is in the bottom portion of said chamber and said lumber-receiving region is thereabove.

3. The improvements of claim 2 in which said chamber has opposite sides with said lumber-receiving region being therebetween, said condenser being located adjacent to one of said sides thereby to radiate heat onto a stack of lumber in said lumber-receiving region.

4. The improvements of claim 3 in which said condenser includes a series of radiator conduits in a vertical coplanar arrangement thereby tp provide a wall of heat adjacent to said lumber-receiving region.

5. The improvements of claim 4 in which said evaporator includes at least one floor surface on which moisture may condense and freeze, said evaporator further including a series of pipes arranged adjacent to the area of said floor surface to cool the same.

6. The improvements of claim 5 in which the surface is centrally elevated and provided with a series of openings therein, an ice compartment positioned in registry beneath said surface and means for scraping mush ice that has collected on said surface through said openings and into said ice compartment.

7. The improvements of claim 6 including means for injecting superheated steam into said chamber.

8. The improvements of claim 6 wherein said pressure-reducing means has a capacity for maintaining the chamber pressure at about $10^{11}$ to $10^{12}$ torr, and said refrigeration system has a capacity for maintaining the temperature in said vapor-absorbing region in the region in the range of about −10° C. to about −40° C.

9. The improvements of claim 8 including at least one "stick," said "stick" comprising a coplanar electrical heater having a plurality of spaced apart bar members, said heater including a plurality of spaced apart elongated resistance elements which extend between said bar members, whereby two adjacent layers of lumber separated by said "stick" will have the facing surfaces thereof directly exposed to said heater.

10. The method of drying green lumber comprising the steps of placing a quantity of green lumber into a sealed chamber, reducing the pressure of said chamber to a predetermined value which is less than the vapor pressure of the moisture in said lumber, refrigerating the interior of said chamber by the use of condenser and evaporator elements, utilizing the heat of compression of said condenser for increasing the temperature of a lumber-receiving region in said chamber, utilizing the cooling of said evaporator for reducing the temperature of a vapor-absorbing region in said chamber to a value below the freezing point of water, the heating of said lumber-receiving region and the cooling of said vapor-absorbing region being simultaneous.

11. The method of claim 10 in which said pressure is reduced at a rate at which moisture in said lumber is diffused to the surfaces and ice crystals are formed thereon, and subliming said ice crystals while maintaining the internal temperature of said lumber above freezing.

12. The method of claim 11 in which moisture in said vapor-absorbing region is condensed and frozen into ice.

13. The method of claim 11 in which superheated steam at superatmospheric pressure injected into said chamber for aiding in the reduction of pressure therein.

14. The method of claim 11 in which the refrigeration steps of compression and evaporation are performed solely within the chamber, the compression being performed in the upper portion thereof and the evaporation in the lower portion.

UNITED STATES PATENT OFFICE
CERTIFICATE OF CORRECTION

Patent No. 3,574,949          Dated April 13, 1971

Inventor(s) Philo T. Farnsworth

It is certified that error appears in the above-identified patent and that said Letters Patent are hereby corrected as shown below:

SPECIFICATION

Column 2, line 19, "I-beam" should be ---I-beams---;
Column 2, line 23, "vacuum-tight" should be ---vacuumtight
Column 2, line 34, "I-beam" should be ---I-beams---;
Column 2, line 62, "I-beam" should be ---I-beams---;
Column 2, line 63, insert ---degree--- after "150";
Column 4, line 11, "$10^{11}$" should be ---$10^{-1}$---;
Column 4, line 19, "$10^{11}$" should be ---$10^{-1}$---.

CLAIMS

Claim 4, Column 6, line 3, "tp" should be ---to---;
Claim 8, Column 6, line 3, "$10^{11}$" should be ---$10^{-1}$---;
Claim 8, Column 6, line 3, "$10^{12}$" should be ---$10^{-2}$---;
Claim 8, Column 6, line 5, delete "in the region";
Claim 13, Column 6, line 2, insert ---is--- before "inject Signed and sealed this 26th day of October 1971.

(SEAL)
Attest:

EDWARD M. FLETCHER, JR.
Attesting Officer

ROBERT GOTTSCHALK

Acting Commissioner of ]